US010539902B2

(12) United States Patent
Teramura

(10) Patent No.: US 10,539,902 B2
(45) Date of Patent: Jan. 21, 2020

(54) LIGHT SCANNING APPARATUS AND IMAGE FORMING APPARATUS

(71) Applicant: CANON KABUSHIKI KAISHA, Tokyo (JP)

(72) Inventor: Masayasu Teramura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/299,761

(22) Filed: Mar. 12, 2019

(65) Prior Publication Data

US 2019/0286007 A1 Sep. 19, 2019

(30) Foreign Application Priority Data

Mar. 16, 2018 (JP) ................................ 2018-048942

(51) Int. Cl.

*G03G 15/00* (2006.01)
*G03G 15/04* (2006.01)
*G02B 26/12* (2006.01)

(52) U.S. Cl.

CPC ..... *G03G 15/04036* (2013.01); *G02B 26/123* (2013.01)

(58) Field of Classification Search

CPC .......... G03G 15/221; G03G 15/04072; G03G 15/326; G03G 15/04018; G03G 15/04054; B41J 2/45

USPC ........................................................... 399/4

See application file for complete search history.

(56) References Cited

U.S. PATENT DOCUMENTS

| | | | |
|---|---|---|---|
| 9,217,863 | B2 | 12/2015 | Teramura |
| 9,575,431 | B2 | 2/2017 | Teramura |
| 2011/0316960 | A1 | 12/2011 | Igarashi et al. |

FOREIGN PATENT DOCUMENTS

| | | | |
|---|---|---|---|
| JP | 2010072049 | A | 4/2010 |
| JP | 2012013754 | A | 1/2012 |

*Primary Examiner* — Walter L Lindsay, Jr.

(74) *Attorney, Agent, or Firm* — Carter, DeLuca & Farrell LLP

(57) ABSTRACT

Light scanning apparatus includes a first imaging optical system including one or more imaging optical elements (IOEs) and a first reflective element on optical path between deflecting unit and a first one of IOEs having greatest power in sub-scanning section, and a second imaging optical system including one or more IOEs and a second reflective element on optical path between second scanned surface and a second one of IOEs having greatest power in sub-scanning section. A straight line passing through first and second light-condensing positions of first and second light fluxes deflected by deflecting unit on first and second optical axes is not perpendicular to sub-scanning direction. Distances on first and second optical axes from first and second axial deflecting points to first and second IOEs, and distances on first and second optical axes from first and second axial deflecting points to first and second scanned surfaces are appropriately set.

20 Claims, 4 Drawing Sheets

LIGHT SCANNING APPARATUS AND IMAGE FORMING APPARATUS

BACKGROUND OF THE INVENTION

Field of the Invention

The present invention relates to a light scanning apparatus, which is particularly suitable for an image forming apparatus such as a laser beam printer (LBP), a digital copier, and a multifunction printer (MFP).

Description of the Related Art

Recently, there has been known a light scanning apparatus configured to deflect a plurality of light fluxes emitted from the corresponding light sources by a single deflecting unit to scan a plurality of scanned surfaces through a plurality of imaging optical systems so as to downsize the light scanning apparatus.

In order to make further downsizing of such a light scanning apparatus while avoiding interference between the optical elements provided in the imaging optical systems, Japanese Patent Application Laid-Open No. 2010-072049 discloses a light scanning apparatus in which imaging optical systems employ different arrangements of imaging optical elements.

Further, Japanese Patent Application Laid-Open No. 2012-013754 discloses a light scanning apparatus in which imaging optical systems have different lengths of optical paths of imaging optical systems.

However, when the imaging optical systems employ different arrangements of imaging optical elements as disclosed in Japanese Patent Application Laid-Open No. 2010-072049, imaging optical elements in some imaging optical systems are arranged away from the scanned surface, and this increases the magnification.

When the imaging optical systems have different lengths of optical paths as disclosed in Japanese Patent Application Laid-Open No. 2012-013754, photosensitive bodies are inevitably arranged at wide intervals when the imaging optical systems are mounted in an image forming apparatus, and this increases the size of the image forming apparatus.

SUMMARY OF THE INVENTION

Thus, an object of the present invention is to provide a downsized light scanning apparatus, which avoids increase of the magnifications of imaging optical systems and increase of the size of an image forming apparatus in which the imaging optical systems is mounted.

A light scanning apparatus according to the present invention includes: a deflecting unit including first and second deflecting surfaces configured to deflect first and second light fluxes to scan first and second scanned surfaces in a main scanning direction; and first and second imaging optical systems configured to condense the first and second light fluxes deflected by the deflecting unit on the first and second scanned surfaces, in which the first imaging optical system includes one or more imaging optical elements and a first reflective element arranged on an optical path between a first imaging optical element and the deflecting unit, the first imaging optical element having the greatest refractive power in a sub-scanning section out of the one or more imaging optical elements, the second imaging optical system includes one or more imaging optical elements and a second reflective element arranged on an optical path between a second imaging optical element and the second scanned surface, the second imaging optical element having the greatest refractive power in the sub-scanning section out of the one or more imaging optical elements, a straight line, which passes through first and second light-condensing positions of the first and second light fluxes deflected by the deflecting unit on first and second optical axes of the first and second imaging optical systems, is not perpendicular to a sub-scanning direction, and the following conditional expression is satisfied:

$$L1/T1>L2/T2,$$

where L1 represents a distance on the first optical axis between a first axial deflecting point on the first deflecting surface and the first imaging optical element, T1 represents a distance on the first optical axis between the first axial deflecting point and the first scanned surface, L2 represents a distance on the second optical axis between a second axial deflecting point on the second deflecting surface and the second imaging optical element, and T2 represents a distance on the second optical axis between the second axial deflecting point and the second scanned surface.

Further features of the present invention will become apparent from the following description of exemplary embodiments with reference to the attached drawings.

DESCRIPTION OF THE EMBODIMENTS

Hereinafter, a light scanning apparatus according to this embodiment is described in detail with reference to the accompanying drawings. The following drawings may be illustrated in different scales from the actual structure for the sake of easy interpretation of this embodiment.

In the following descriptions, a main scanning direction is a direction perpendicular to a rotational axis of a deflecting unit and an optical axis of an optical system, and a sub-scanning direction is a direction parallel to the rotational axis of the deflecting unit. A main scanning section is a section perpendicular to the sub-scanning direction, and a sub-scanning section is a section perpendicular to the main scanning direction.

It should be noted that the main scanning direction and the sub-scanning section are different between an incident optical system and an imaging optical system.

First Embodiment

Figure 1A:
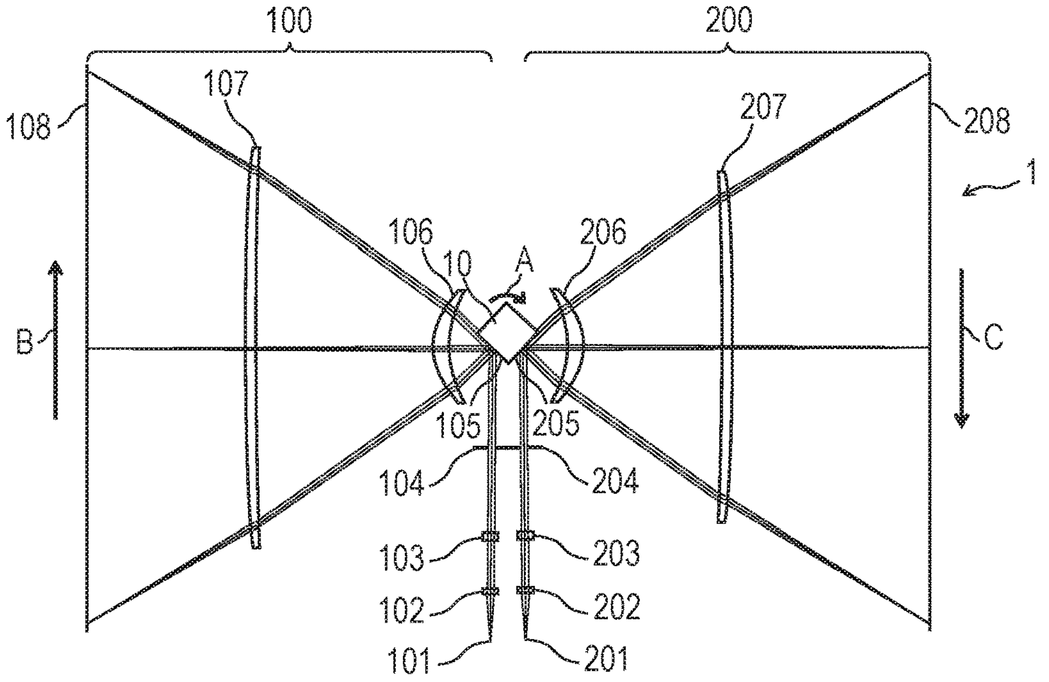
FIG. 1A is a developed view in a main scanning section of a light scanning apparatus according to a first embodiment.
Figure 1B:
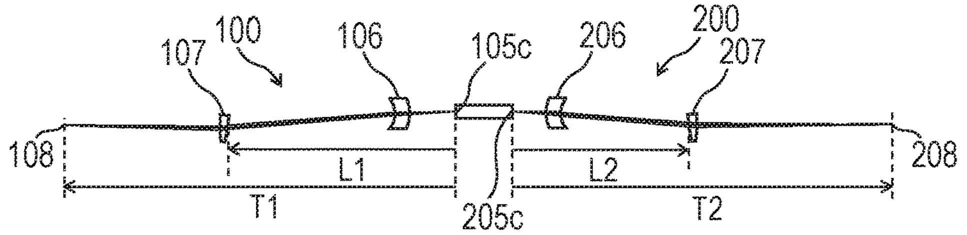
FIG. 1B is a developed view in a sub-scanning section of imaging optical systems included in the light scanning apparatus according to the first embodiment.
Figure 1C:
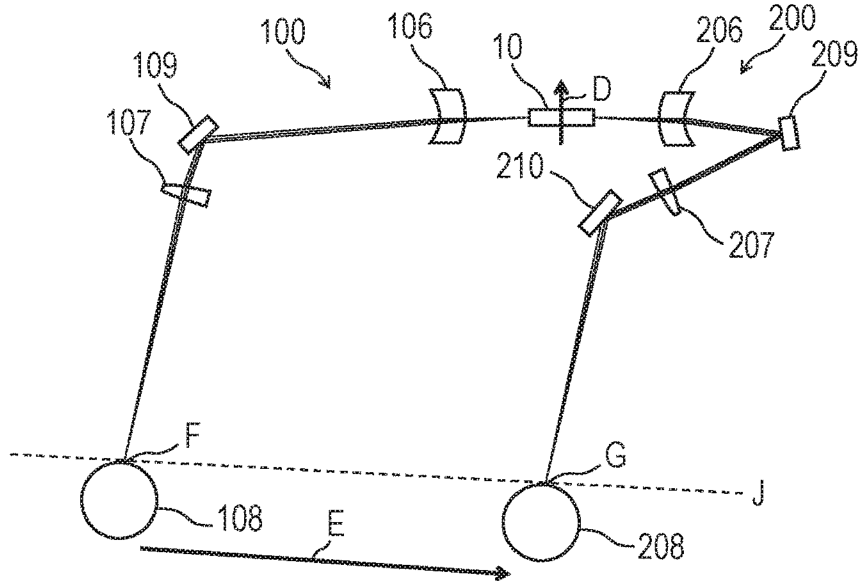
FIG. 1C is a view in the sub-scanning section of the imaging optical systems included in the light scanning apparatus according to the first embodiment.

FIG. 1A illustrates a developed view in the main scanning section of a light scanning apparatus 1 according to a first embodiment. FIG. 1B illustrates a developed view in the sub-scanning section of a first imaging optical system 100 and a second imaging optical system 200 included in the light scanning apparatus 1 according to the first embodiment. FIG. 1C illustrates a view in a sub-scanning section of the first and second imaging optical systems 100 and 200 included in the light scanning apparatus 1 according to the first embodiment.

The light scanning apparatus 1 according to this embodiment includes a first light source 101 and a second light source 201, a first collimator lens 102 and a second collimator lens 202, a first cylindrical lens 103 and a second cylindrical lens 203, and a first aperture stop 104 and a second aperture stop 204.

The light scanning apparatus 1 according to this embodiment further includes a deflecting unit 10, first fθ lenses 106 and 206, second fθ lenses 107 and 207, and reflective elements 109, 209, and 210.

A semiconductor laser or the like is used as the first and second light sources 101 and 201. The number of light emitting points of the first and second light sources 101 and 201 may be one or more.

The first and second collimator lenses 102 and 202 respectively convert light fluxes LA and LB emitted by the first and second light sources 101 and 201 to parallel light fluxes. The parallel light flux herein includes not only an exact parallel light flux but also a substantial parallel light flux such as a slightly divergent light flux and a slightly convergent light flux.

The first and second cylindrical lenses 103 and 203 respectively have finite refractive power in the sub-scanning sections and condense the light fluxes LA and LB, which pass through the first and second collimator lenses 102 and 202, in the sub-scanning direction.

The first and second aperture stops 104 and 204 respectively limit light flux diameters in the main scanning direction and the sub-scanning direction of the light fluxes LA and LB, which pass through the first and second cylindrical lenses 103 and 203.

The light fluxes LA and LB emitted by the first and second light sources 101 and 201 are thus respectively condensed only in the sub-scanning direction around a first deflecting surface 105 and a second deflecting surface 205 of the deflecting unit 10 and imaged as a long line in the main scanning direction.

The deflecting unit 10 rotates in an arrow A direction in FIG. 1A by an unillustrated drive unit such as a motor and deflects the light fluxes LA and LB entering the deflecting unit 10. The deflecting unit 10 is made of a polygon mirror, for example.

The first and second fθ lenses 106 and 107 are anamorphic imaging lenses each having different refractive power in the main scanning section and the sub-scanning section, which condense (guide) the light flux LA deflected by the first deflecting surface 105 of the deflecting unit 10 on a first scanned surface 108.

The first and second fθ lenses 206 and 207 are anamorphic imaging lenses each having different refractive power in the main scanning section and the sub-scanning section, which condense (guide) the light flux LB deflected by the second deflecting surface 205 of the deflecting unit 10 on a second scanned surface 208.

The reflective elements 109, 209, and 210 are units for reflecting light fluxes, which may be vapor-deposited mirrors.

The light flux LA (first light flux) emitted by the first light source 101 is converted to a parallel light flux by the first collimator lens 102.

The converted light flux LA is condensed in the sub-scanning direction by the first cylindrical lens 103, passes through the first aperture stop 104, and enters the first deflecting surface 105 of the deflecting unit 10 from above in the sub-scanning direction.

The light flux LA emitted by the first light source 101 and entering the first deflecting surface 105 of the deflecting unit 10 is deflected by the deflecting unit 10 and thereafter condensed on the first scanned surface 108 by the first and second fθ lenses 106 and 107 and the reflective element 109 (first reflective element). The light flux LA deflected by the deflecting unit 10 then scans the first scanned surface 108 at a constant speed.

Since the deflecting unit 10 rotates in the A direction in FIG. 1A, the light flux LA deflected for scanning scans the first scanned surface 108 in a B direction in FIG. 1A.

The light flux LB (second light flux) emitted by the second light source 201 is converted to a parallel light flux by the second collimator lens 202.

The converted light flux LB is condensed in the sub-scanning direction by the second cylindrical lens 203, passes through the second aperture stop 204, and enters the second deflecting surface 205 of the deflecting unit 10 from above in the sub-scanning direction.

The light flux LB emitted by the second light source 201 and entering the second deflecting surface 205 of the deflecting unit 10 is deflected by the deflecting unit 10 and thereafter condensed on the second scanned surface 208 by the first and second fθ lenses 206 and 207, the reflective element 209, and the reflective element 210 (second reflective element). The light flux LB deflected by the deflecting unit 10 then scans the second scanned surface 208 at a constant speed.

Since the deflecting unit 10 rotates in the A direction in FIG. 1A, the light flux LB deflected for scanning scans the second scanned surface 208 in a C direction in FIG. 1A.

In the light scanning apparatus 1 according to this embodiment, the first collimator lens 102, the first cylindrical lens 103, and the first aperture stop 104 form a first incident optical system 80.

In the light scanning apparatus 1 according to this embodiment, the second collimator lens 202, the second cylindrical lens 203, and the second aperture stop 204 form a second incident optical system 85.

In the light scanning apparatus 1 according to this embodiment, the first fθ lens 106 and the second fθ lens 107 (first imaging optical element) form the first imaging optical system 100.

In the light scanning apparatus 1 according to this embodiment, the first fθ lens 206 and the second fθ lens 207 (second imaging optical element) form the second imaging optical system 200.

In the light scanning apparatus 1 according to this embodiment, optical axes of the first and second incident optical systems 80 and 85 make an angle of +3.0 degrees with the main scanning section in the sub-scanning section.

In the light scanning apparatus 1 according to this embodiment, imaging optical elements having the greatest refractive power in the sub-scanning section on the same optical path are the second fθ lenses 107 and 207.

In the first imaging optical system 100, the reflective element 109 is provided between the imaging optical element 107 and the deflecting unit 10, the imaging optical element 107 having the greatest refractive power in the sub-scanning section out of the imaging optical elements 106 and 107 included in the first imaging optical system 100 on the optical path.

In the second imaging optical system 200, the reflective element 210 is provided between the imaging optical element 207 and the second scanned surface 208, the imaging optical element 207 having the greatest refractive power in the sub-scanning section out of the imaging optical elements 206 and 207 included in the second imaging optical system 200 on the optical path.

In this embodiment, photosensitive drums 108 and 208 are used as the first and second scanned surfaces.

Exposure distributions in the sub-scanning direction on the photosensitive drums 108 and 208 are made by rotating the photosensitive drums 108 and 208 in the sub-scanning direction every main scanning exposure.

Arrangement direction E of the photosensitive drums 108 and 208 is not orthogonal to a rotational axis direction (i.e., sub-scanning direction) D of the deflecting unit 10, and makes an angle of −93 degrees with the rotational axis direction in this embodiment.

Next, features of the first and second incident optical systems 80 and 85 and the first and second imaging optical systems 100 and 200 of the light scanning apparatus 1 according to this embodiment are indicated in the following tables 1 to 3.

TABLE 1

| features of first and second light sources 101 and 201 | | |
|---|---|---|
| number of emitting point | N (piece) | 2 |
| rotation angle | (deg) | −6.54 |
| arrangement | (dimension) | 1 |
| pitch | pitch (mm) | 0.09 |
| wavelength | λ (nm) | 790 |
| incident polarization on first and second deflecting surfaces 105 and 205 of deflecting unit 10 | | p polarization |
| full width at half maximum in main scanning direction | FFPy (deg) | 12.00 |
| full width at half maximum in sub-scanning direction | FFPz (deg) | 30.00 |

| shape of stop | main scanning direction | sub-scanning direction |
|---|---|---|
| first and second aperture stops 104 and 204 | 3.050 | 0.782 |

| refractive index | | |
|---|---|---|
| first and second collimator lenses 102 and 202 | N1 | 1.762 |
| first and second cylindrical lenses 103 and 203 | N2 | 1.524 |

| shape of optical element | | main scanning direction | sub-scanning direction |
|---|---|---|---|
| curvature radius of incident surfaces of first and second collimator lenses 102 and 202 | r1a (mm) | ∞ | ∞ |
| curvature radius of exit surfaces of first and second collimator lenses 102 and 202 | r1b (mm) | 15.216 | 15.216 |
| curvature radius of incident surfaces of first and second cylindrical lenses 103 and 203 | r2a (mm) | ∞ | −41.028 |
| curvature radius of exit surfaces of first and second cylindrical lenses 103 and 203 | r2b (mm) | ∞ | ∞ |

| focal length | | main scanning direction | sub-scanning direction |
|---|---|---|---|
| first and second collimator lenses 102 and 202 | fcol (mm) | 19.98 | 19.98 |
| first and second cylindrical lenses 103 and 203 | fcyl (mm) | ∞ | 78.30 |

TABLE 1-continued

| arrangement | | |
|---|---|---|
| first and second light sources 101 and 201 to first and second collimator lenses 102 and 202 | d0 (mm) | 18.31 |
| incident surfaces of first and second collimator lenses 102 and 202 to exit surfaces of first and second collimator lenses 102 and 202 | d1 (mm) | 3.25 |
| exit surfaces of first and second collimator lenses 102 and 202 to incident surfaces of first and second cylindrical lenses 103 and 203 | d2 (mm) | 19.77 |
| incident surfaces of first and second cylindrical lenses 103 and 203 to exit surfaces of first and second cylindrical lenses 103 and 203 | d3 (mm) | 3.00 |
| exit surfaces of first and second cylindrical lenses 103 and 203 to first and second aperture stops 104 and 204 | d4 (mm) | 36.71 |
| first and second aperture stops 104 and 204 to first and second deflecting surfaces 105 and 205 of deflecting unit 10 | d5 (mm) | 40.33 |
| incident angle in main scanning section to first deflecting surface 105 of first incident optical system 80 | A1 (deg) | 90.00 |
| incident angle in main scanning section to second deflecting surface 205 of second incident optical system 85 | A2 (deg) | −90.00 |
| incident angle in sub-scanning section to first deflecting surface 105 of first incident optical system 80 | A3 (deg) | 3.00 |
| incident angle in sub-scanning section to second deflecting surface 205 of second incident optical system 85 | A4 (deg) | 3.00 |

TABLE 2

| fθ coefficient, scanning angle, angle of view | | |
|---|---|---|
| fθ coefficient | k (mm/rad) | 146 |
| scanning width | W (mm) | 230 |
| maximum angle of view | θ (deg) | 22.6 |
| **refractive index** | | |
| refractive index of first fθ lens 106 | N5 | 1.524 |
| refractive index of second fθ lens 107 | N6 | 1.524 |
| **first imaging optical system 100, arrangement** | | |
| first deflecting surface 105 of deflecting unit 10 to incident surface of first fθ lens 106 | d12 (mm) | 17.00 |
| incident surface of first fθ lens 106 to exit surface of first fθ lens 106 | d13 (mm) | 6.70 |
| exit surface of first fθ lens 106 to incident surface of second fθ lens 107 | d14 (mm) | 72.30 |
| incident surface of second fθ lens 107 to exit surface of second fθ lens 107 | d15 (mm) | 3.50 |
| exit surface of second fθ lens 107 to first scanned surface 108 | d16 (mm) | 68.50 |
| first deflecting surface 105 of deflecting unit 10 to incident surface of second fθ lens 107 | L1 (mm) | 96.00 |
| first deflecting surface 105 of deflecting unit 10 to first scanned surface 108 | T1 (mm) | 168.00 |

| first fθ lens 106 shape of meridional line | | |
|---|---|---|
| | incident surface opposite of light source side | exit surface opposite of light source side |
| R | −49.912 | −30.370 |
| ku | 3.517E+00 | −3.284E+00 |
| B4u | 8.144E−06 | −1.046E−05 |

TABLE 2-continued

| | | |
|---|---|---|
| B6u | 1.731E−08 | 1.703E−08 |
| B8u | −6.571E−11 | −2.092E−11 |
| B10u | 8.472E−14 | −8.007E−15 |
| B12u | 0 | 0 |
| | light source side | light source side |
| kl | 3.517E+00 | −3.284E+00 |
| B4l | 8.144E−06 | −1.050E−05 |
| B6l | 1.731E−08 | 1.749E−08 |
| B8l | −6.571E−11 | −2.257E−11 |
| B10l | 8.472E−14 | −6.096E−15 |
| B12l | 0 | 0 |
| first fθ lens 106 shape of sagittal line | | |
| | incident surface R variation of sagittal line | exit surface R variation of sagittal line |
| r | 13.000 | 22.244 |
| E1 | 0 | −1.642E−04 |
| E2 | 0 | −1.204E−03 |
| E3 | 0 | 0 |
| E4 | 0 | 1.538E−06 |
| E5 | 0 | 0 |
| E6 | 0 | −9.773E−10 |
| E7 | 0 | 0 |
| E8 | 0 | 0 |
| E9 | 0 | 0 |
| E10 | 0 | 0 |
| | tilt of sagittal line | tilt of sagittal line |
| M0_1 | 0 | 8.101E−02 |
| M1_1 | 0 | −1.262E−06 |
| M2_1 | 0 | −9.130E−05 |
| M3_1 | 0 | −9.910E−08 |
| M4_1 | 0 | 1.107E−08 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |
| second fθ lens 107 shape of meridional line | | |
| | incident surface opposite of light source side | exit surface opposite of light source side |
| R | −10000 | 279.878 |
| ku | 0 | −5.367E+01 |
| B4u | 0 | −3.311E−07 |
| B6u | 0 | 4.279E−11 |
| B8u | 0 | −4.922E−15 |
| B10u | 0 | 3.461E−19 |
| B12u | 0 | −1.034E−23 |
| | light source side | light source side |
| kl | 0 | −5.367E+01 |
| B4l | 0 | −3.335E−07 |
| B6l | 0 | 4.318E−11 |
| B8l | 0 | −4.880E−15 |
| B10l | 0 | 3.327E−19 |
| B12l | 0 | −9.723E−24 |
| second fθ lens 107 shape of sagittal line | | |
| | incident surface R variation of sagittal line | exit surface R variation of sagittal line |
| r | 22.604 | −1000 |
| E1 | 9.474E−05 | 0 |

TABLE 2-continued

| | | |
|---|---|---|
| E2 | 8.693E−05 | 0 |
| E3 | 0 | 0 |
| E4 | −4.848E−09 | 0 |
| E5 | 0 | 0 |
| E6 | 1.645E−13 | 0 |
| E7 | 0 | 0 |
| E8 | −2.038E−17 | 0 |
| E9 | 0 | 0 |
| E10 | 0 | 0 |
| | tilt of sagittal line | tilt of sagittal line |
| M0_1 | −1.683E−01 | 2.737E−02 |
| M1_1 | −2.480E−04 | −2.605E−04 |
| M2_1 | 6.372E−06 | −1.325E−05 |
| M3_1 | 4.718E−08 | 4.429E−08 |
| M4_1 | −2.700E−09 | 5.426E−10 |
| M5_1 | −5.354E−28 | 2.061E−28 |
| M6_1 | 3.256E−14 | −3.757E−13 |
| M7_1 | 8.193E−16 | 3.438E−16 |
| M8_1 | 1.575E−16 | 1.071E−16 |
| M9_1 | −2.174E−20 | 6.387E−20 |
| M10_1 | −3.849E−21 | 6.178E−21 |
| M11_1 | 0 | 0 |
| M12_1 | 0 | 0 |

TABLE 3

| | | |
|---|---|---|
| fθ coefficient, scanning angle, angle of view | | |
| fθ coefficient | k (mm/rad) | 146 |
| scanning width | W (mm) | 230 |
| maximum angle of view | θ (deg) | 22.6 |
| refractive index | | |
| refractive index of first fθ lens 206 | N5 | 1.524 |
| refractive index of second fθ lens 207 | N6 | 1.524 |
| second imaging optical system 200, arrangement | | |
| second deflecting surface 205 of deflecting unit 10 to incident surface of first fθ lens 206 | d12 (mm) | 17.00 |
| incident surface of first fθ lens 206 to exit surface of first fθ lens 206 | d13 (mm) | 6.70 |
| exit surface of first fθ lens 206 to incident surface of second fθ lens 207 | d14 (mm) | 56.30 |
| incident surface of second fθ lens 207 to exit surface of second fθ lens 207 | d15 (mm) | 3.50 |
| exit surface of second fθ lens 207 to second scanned surface 208 | d16 (mm) | 84.50 |
| second deflecting surface 205 of deflecting unit 10 to incident surface of second fθ lens 207 | L2 (mm) | 80.00 |
| second deflecting surface 205 of deflecting unit 10 to second scanned surface 208 | T2 (mm) | 168.00 |
| first fθ lens 206 shape of meridional line | | |
| | incident surface opposite of light source side | exit surface opposite of light source side |
| R | −39.866 | −26.253 |
| ku | 2.065E+00 | −2.866E+00 |
| B4u | 9.292E−06 | −1.398E−05 |
| B6u | 3.110E−08 | 2.362E−08 |
| B8u | −1.025E−10 | −2.189E−11 |
| B10u | 1.310E−13 | −2.171E−14 |
| B12u | 0 | 0 |
| | light source side | light source side |
| kl | 2.065E+00 | −2.866E+00 |
| B4l | 9.292E−06 | −1.412E−05 |

TABLE 3-continued

| | | |
|---|---|---|
| B6l | 3.110E−08 | 2.454E−08 |
| B8l | −1.025E−10 | −2.394E−11 |
| B10l | 1.310E−13 | −1.979E−14 |
| B12l | 0 | 0 |

first fθ lens 206 shape of sagittal line

| | incident surface R variation of sagittal line | exit surface R variation of sagittal line |
|---|---|---|
| r | 13.000 | 11.268 |
| E1 | 0 | 1.455E−04 |
| E2 | 0 | −1.686E−04 |
| E3 | 0 | 0 |
| E4 | 0 | −4.846E−07 |
| E5 | 0 | 0 |
| E6 | 0 | 1.156E−09 |
| E7 | 0 | 0 |
| E8 | 0 | 0 |
| E9 | 0 | 0 |
| E10 | 0 | 0 |

| | tilt of sagittal line | tilt of sagittal line |
|---|---|---|
| M0_1 | 0 | 3.845E−02 |
| M1_1 | 0 | −9.266E−06 |
| M2_1 | 0 | −8.686E−05 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

second fθ lens 207 shape of meridional line

| | incident surface opposite of light source side | exit surface opposite of light source side |
|---|---|---|
| R | −10000 | 228.410 |
| ku | 0 | −5.462E+01 |
| B4u | 0 | −5.399E−07 |
| B6u | 0 | 1.054E−10 |
| B8u | 0 | −1.701E−14 |
| B10u | 0 | 1.722E−18 |
| B12u | 0 | −7.826−23 |

| | light source side | light source side |
|---|---|---|
| kl | 0 | −5.462E+01 |
| B4l | 0 | −5.411E−07 |
| B6l | 0 | 1.067E−10 |
| B8l | 0 | −1.777E−14 |
| B10l | 0 | 1.890E−18 |
| B12l | 0 | −9.085E−23 |

second fθ lens 207 shape of sagittal line

| | incident surface R variation of sagittal line | exit surface R variation of sagittal line |
|---|---|---|
| r | 60.676 | −31.725 |
| E1 | 0 | 2.169E−04 |
| E2 | 4.470E−04 | 3.483E−05 |
| E3 | 0 | 0 |
| E4 | −4.827E−08 | 5.550E−09 |
| E5 | 0 | 0 |
| E6 | −2.372E−12 | −3.405E−12 |
| E7 | 0 | 0 |
| E8 | 2.304E−15 | 2.138E−16 |

TABLE 3-continued

| | | |
|---|---|---|
| E9 | 0 | 0 |
| E10 | 0 | 0 |
| | tilt of sagittal line | tilt of sagittal line |
| M0_1 | −9.462E−02 | 8.550E−02 |
| M1_1 | −3.547E−04 | −3.581E−04 |
| M2_1 | −2.849E−06 | −3.393E−05 |
| M3_1 | 5.463E−08 | 7.297E−08 |
| M4_1 | −1.278E−09 | 9.985E−09 |
| M5_1 | −2.873E−12 | −1.851E−11 |
| M6_1 | 1.077E−12 | −2.695E−12 |
| M7_1 | −2.305E−15 | 1.912E−15 |
| M8_1 | 2.333E−16 | 7.635E−16 |
| M9_1 | 1.496E−19 | −2.569E−19 |
| M10_1 | −2.586E−20 | −4.568E−20 |
| M11_1 | 0 | 0 |
| M12_1 | 0 | 0 |

In the tables 1 to 3, assuming that an intersection of each lens surface and the optical axis of each lens is the origin, a direction of the optical axis is X axis, a direction orthogonal to the optical axis in the main scanning section is Y axis, and a direction orthogonal to the optical axis in the sub-scanning section is Z axis. In tables 2 and 3, "E−x" means "$\times 10^{-x}$."

An aspherical shape (shape of meridional line) in the main scanning section of each lens surface of the first and second fθ lenses 106, 107, 206, and 207 of the light scanning apparatus 1 according to this embodiment is expressed by the following expression (1):

$$x = \frac{y^2/R}{1+(1-(1+k)(y/R)^2)^{1/2}} + \sum_{i=4}^{16} B_i y^i, \tag{1}$$

where R represents a curvature radius, k represents eccentricity, and Bi (i=4, 6, 8, . . . , 16) represents an aspherical coefficient. When the coefficients Bi are different between a positive side and a negative side of y, an index u is applied to the positive side coefficient (i.e., Biu) and an index 1 is applied to the negative side coefficient (i.e., Bil), as shown in tables 2 and 3.

An aspherical shape (shape of sagittal line) in the sub-scanning section of each lens surface of the first and second fθ lenses 106, 107, 206, and 207 is expressed by the following expression (2):

$$S = \frac{z^2/r'}{1+(1-(z/r')^2)^{1/2}} + \sum_{j=0}^{8}\sum_{k=1}^{1} M_{jk} Y^j Z^k, \tag{2}$$

where Mjk (j=0 to 12, and k=1) is an aspherical coefficient.

A curvature radius r' in the sub-scanning section of each lens surface of the first and second fθ lenses 106, 107, 206, and 207 is sequentially varied according to the y coordinate of the lens surface as being expressed by the following expression (3):

$$r' = r\left(1 + \sum_{j=2}^{10} E_j y^j\right), \tag{3}$$

where r is a curvature radius on the optical axis, and Ej (j=1 to 10) is a variable coefficient.

Next, an effect in the light scanning apparatus 1 according to this embodiment is described.

In the light scanning apparatus 1 according to this embodiment, as illustrated in FIG. 1B, a distance on the optical axis of the first imaging optical system 100 between an axial deflecting point 105*c* (first axial deflecting point) on the first deflecting surface 105 in the main scanning section and the second fθ lens 107 is represented by L1, and a distance on the optical axis of the first imaging optical system 100 between the axial deflecting point 105*c* in the main scanning section and the first scanned surface 108 is represented by T1.

A distance on the optical axis of the second imaging optical system 200 between an axial deflecting point 205*c* (second axial deflecting point) on the second deflecting surface 205 in the main scanning section and the second fθ lens 207 is represented by L2, and a distance on the optical axis of the second imaging optical system 200 between the axial deflecting point 205*c* in the main scanning section and the second scanned surface 208 is represented by T2.

Axial rays herein are a plurality of rays forming a light flux (axial light flux) entering an on-axis image height, and the axial deflecting point is an intersection of a principal ray of the axial light flux (axial principle ray) and the deflecting surface.

In this case, the light scanning apparatus 1 according to this embodiment satisfies L1/T1>L2/T2. When this conditional expression is satisfied, it is possible to achieve downsizing of the light scanning apparatus while suppressing an increase of the magnification of the imaging optical system and an increase of the size of the image forming apparatus in which the light scanning apparatus is mounted.

In the light scanning apparatus 1 according to this embodiment, L1=96 mm, T1=168 mm, L2=80 mm, and T2=168 mm.

L1/T1=0.571 and L2/T2=0.476 are thus obtained, and L1/T1>L2/T2 is satisfied.

It is desirable that the light scanning apparatus 1 according to this embodiment satisfy T1=T2. When this expression is satisfied, it is possible to further suppress an increase of the size of the image forming apparatus due to wide interval between photosensitive bodies.

In the light scanning apparatus 1 according to this embodiment, as illustrated in FIG. 1C, in the second imaging optical system 200, the reflective element 210 is arranged between the second fθ lens 207 and the second scanned surface 208. This makes it possible to achieve downsizing of the light scanning apparatus 1 and secure a space between the light scanning apparatus 1 and the photosensitive drum 208.

Figure 2A:
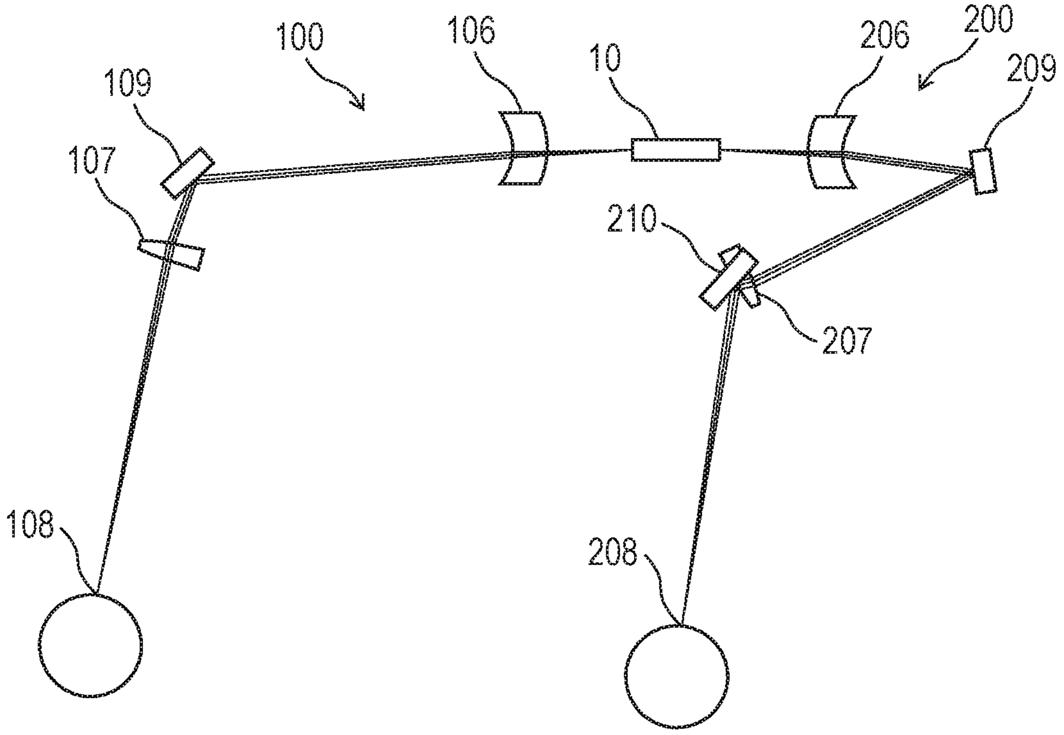
FIG. 2A is a view in a sub-scanning section of imaging optical systems included in a light scanning apparatus according to a comparative example.

If the first and second imaging optical systems 100 and 200 are arranged so as to satisfy T1=T2 and L1=L2 in the light scanning apparatus 1 according to this embodiment, the second fθ lens 207 and the reflective element 210 interfere with each other in the second imaging optical system 200 as illustrated in FIG. 2A.

If the first and second imaging optical systems 100 and 200 are arranged so as to satisfy L1/T1<L2/T2 in the light scanning apparatus 1 according to this embodiment, the reflective element 210 has to be moved to a side of the second scanned surface 208 to avoid the interference between the second fθ lens 207 and the reflective element 210 in the second imaging optical system 200.

This causes increase of the size of the light scanning apparatus 1 and decrease of the space between the photosensitive drum 208 and the light scanning apparatus 1.

In the light scanning apparatus 1 according to this embodiment, as illustrated in FIG. 1C, the arrangement direction E of the photosensitive drums 108 and 208 is inclined at −93 degrees with respect to the rotational axis direction D of the deflecting unit 10 in a direction in which the space of the second imaging optical system 200 is increased. In other words, a straight line J is not perpendicular to the sub-scanning direction D, the straight line J passing through a first light-condensing position F and a second light-condensing position G of the first and second light fluxes LA and LB deflected by the first and second deflecting surfaces 105 and 205 on the respective optical axes of the first and second imaging optical systems 100 and 200. Thus, the interference between the optical elements arranged in the second imaging optical system 200 is avoided.

Figure 2B:
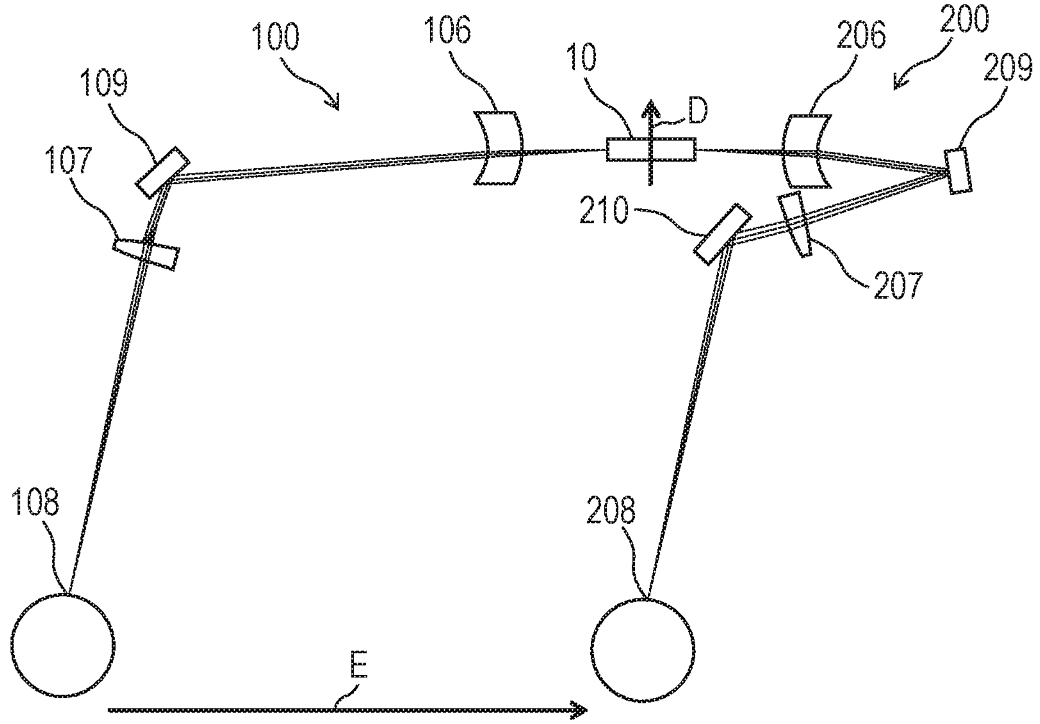
FIG. 2B is a view in the sub-scanning section of the imaging optical systems included in the light scanning apparatus according to the comparative example.

On the other hand, as illustrated in FIG. 2B, if the optical elements are arranged such that the rotational axis direction D of the deflecting unit 10 and the arrangement direction E of the photosensitive drums 108 and 208 are orthogonal to each other, the interference occurs because the first fθ lens 206 and the second fθ lens 207 are close to each other in the second imaging optical system 200.

In the light scanning apparatus 1 according to this embodiment, the reflective element 210 is arranged on the second scanned surface 208 side of the main scanning section through the deflecting unit 10. In other words, the reflective element 210 is arranged between the main scanning section through the deflecting unit 10 and a section including the first scanned surface 108 and the second scanned surface 208. In still other words, the reflective element 210 is arranged between a section, which includes surface normals of the first deflecting surface 105 and the second deflecting surface 205, and a section, which includes the straight line J passing through the first and second light-condensing positions F and G of the first and second light fluxes LA and LB on the optical axes of the first and second imaging optical systems 100 and 200 and is parallel to the first and second scanned surfaces 108 and 208. This makes it possible to achieve downsizing of the light scanning apparatus.

As described above, in the light scanning apparatus 1 according to this embodiment, the optical elements are arranged so as to satisfy the abovementioned relationship. This makes it possible to achieve downsizing of the light scanning apparatus 1 while avoiding the interference between the optical elements and secure the space between the light scanning apparatus 1 and the photosensitive drums 108 and 208.

Second Embodiment

Figure 3A:
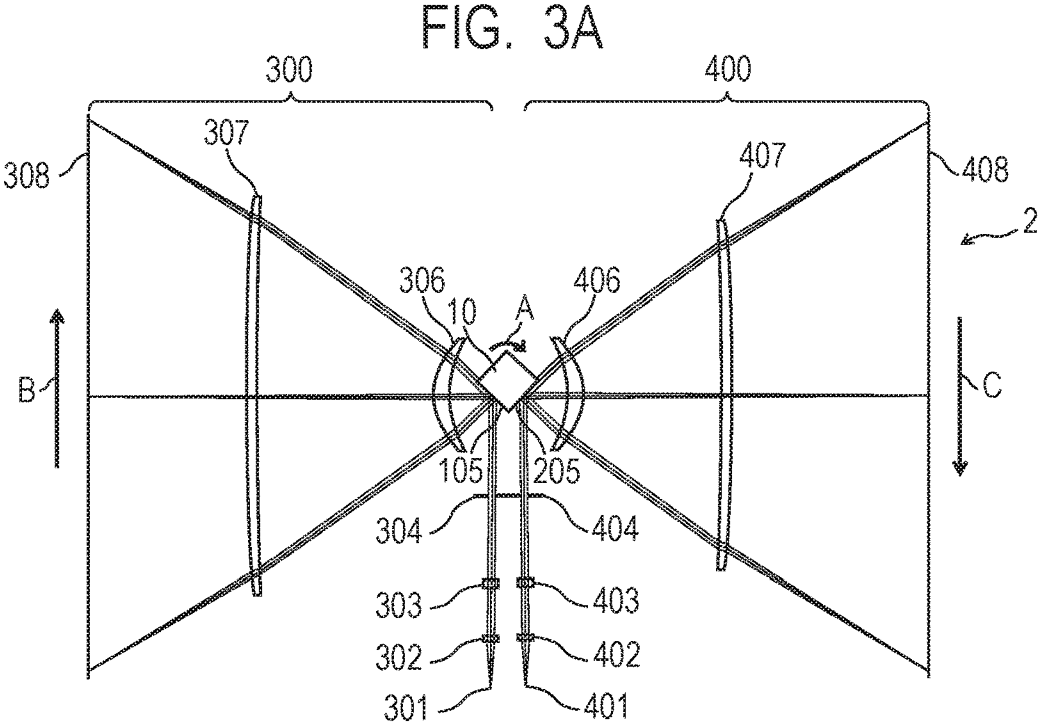
FIG. 3A is a developed view in a main scanning section of a light scanning apparatus according to a second embodiment.
Figure 3B:
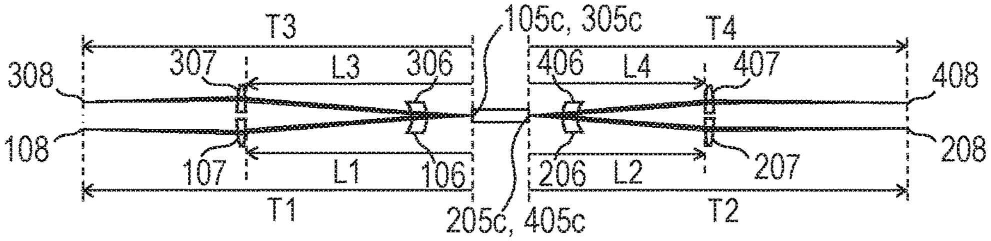
FIG. 3B is a developed view in a sub-scanning section of imaging optical systems included in the light scanning apparatus according to the second embodiment.
Figure 3C:
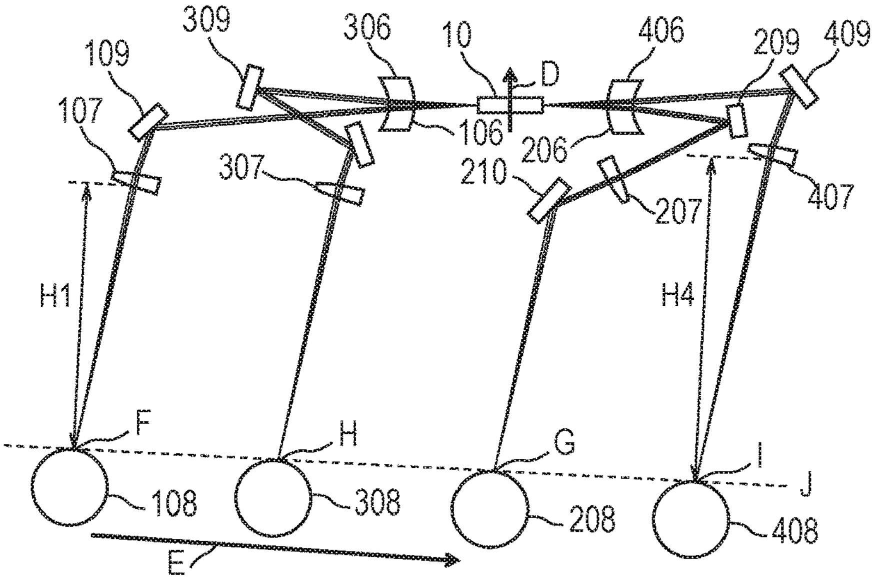
FIG. 3C is a view in a sub-scanning section of the imaging optical systems included in the light scanning apparatus according to the second embodiment.

FIG. 3A illustrates a partial developed view in a main scanning section of a light scanning apparatus 2 according to a second embodiment. FIG. 3B illustrates a developed view in a sub-scanning section of first to fourth imaging optical systems 100 to 400 included in the light scanning apparatus 2 according to the second embodiment. FIG. 3C illustrates a view in the sub-scanning section of the first to fourth imaging optical systems 100 to 400 included in the light scanning apparatus 2 according to the second embodiment.

Since the first and second incident optical systems 80 and 85 and the first and second imaging optical systems 100 and 200 in the light scanning apparatus 2 according to this embodiment have the same configurations as those in the light scanning apparatus 1 according to the first embodiment, descriptions of the same members are omitted.

The light scanning apparatus 2 according to this embodiment is provided with a third light source 301 and a fourth light source 401, a third collimator lens 302 and a fourth collimator lens 402, a third cylindrical lens 303 and a fourth cylindrical lens 403, and a third aperture stop 304 and a fourth aperture stop 404.

The light scanning apparatus 2 according to this embodiment is further provided with first fθ lenses 306 and 406, second fθ lenses 307 and 407, and reflective elements 309, 310, and 409.

A semiconductor laser or the like is used as the third and fourth light sources 301 and 401. The number of light emitting points of the third and fourth light sources 301 and 401 may be one or more.

The third and fourth collimator lenses 302 and 402 respectively convert light fluxes LC and LD emitted by the third and fourth light sources 301 and 401 to parallel light fluxes. The parallel light flux herein includes not only an exact parallel light flux but also a substantial parallel light flux such as a slightly divergent light flux and a slightly convergent light flux.

The third and fourth cylindrical lenses 303 and 403 respectively have finite refractive power in the sub-scanning sections and condense the light fluxes LC and LD, which pass through the third and fourth collimator lenses 302 and 402, in the sub-scanning direction.

The third and fourth aperture stops 304 and 404 respectively limit light flux diameters in the main scanning direction and the sub-scanning direction of the light fluxes LC and LD, which pass through the third and fourth cylindrical lenses 303 and 403.

The light fluxes LC and LD emitted by the third and fourth light sources 301 and 401 are thus respectively condensed only in the sub-scanning direction around the first and second deflecting surfaces 105 and 205 of the deflecting unit 10 and imaged as a long line in the main scanning direction.

The deflecting unit 10 rotates in an arrow A direction in FIG. 3A by an unillustrated drive unit such as a motor and deflects the light fluxes LA, LB, LC, and LD entering the deflecting unit 10. The deflecting unit 10 is made of a polygon mirror, for example.

The first and second fθ lenses 306 and 307 are anamorphic imaging lenses each having different refractive power in the main scanning section and the sub-scanning section, which condense (guide) the light flux LC deflected by the first deflecting surface 105 of the deflecting unit 10 on a third scanned surface 308.

The first and second fθ lenses 406 and 407 are anamorphic imaging lenses each having different refractive power in the main scanning section and the sub-scanning section, which condense (guide) the light flux LD deflected by the second deflecting surface 205 of the deflecting unit 10 on a fourth scanned surface 408.

The reflective elements 309, 310, and 409 are units for reflecting light fluxes, which may be vapor-deposited mirrors.

The light flux LA (first light flux) emitted by the first light source 101 enters the first deflecting surface 105 of the deflecting unit 10 from above in the sub-scanning direction by the first incident optical system 80.

The light flux LA emitted by the first light source 101 and entering the first deflecting surface 105 of the deflecting unit 10 is deflected by the deflecting unit 10 and thereafter condensed on the first scanned surface 108 by the first and second fθ lenses 106 and 107 and the reflective element 109. The light flux LA deflected by the deflecting unit 10 then scans the first scanned surface 108 at a constant speed.

The light flux LB (second light flux) emitted by the second light source 201 enters the second deflecting surface 205 of the deflecting unit 10 from above in the sub-scanning direction by the second incident optical system 85.

The light flux LB emitted by the second light source 201 and entering the second deflecting surface 205 of the deflecting unit 10 is deflected by the deflecting unit 10 and thereafter condensed on the second scanned surface 208 by the first and second fθ lenses 206 and 207 and the reflective elements 209 and 210. The light flux LB deflected by the deflecting unit 10 then scans the second scanned surface 208 at a constant speed.

The light flux LC (third light flux) emitted by the third light source 301 is converted to a parallel light flux by the third collimator lens 302.

The converted light flux LC is condensed in the sub-scanning direction by the third cylindrical lens 303, passes through the third aperture stop 304, and enters the first deflecting surface 105 of the deflecting unit 10 from below in the sub-scanning direction.

The light flux LC emitted by the third light source 301 and entering the first deflecting surface 105 of the deflecting unit 10 is deflected by the deflecting unit 10 and thereafter condensed on the third scanned surface 308 by the first and second fθ lenses 306 and 307, the reflective element 309 (third reflective element), and the reflective element 310. The light flux LC deflected by the deflecting unit 10 then scans the third scanned surface 308 at a constant speed.

Since the deflecting unit 10 rotates in the A direction in FIG. 3A, the light flux LC deflected for scanning scans the third scanned surface 308 in a B direction in FIG. 3A.

The light flux LD (fourth light flux) emitted by the fourth light source 401 is converted to a parallel light flux by the fourth collimator lens 402.

The converted light flux LD is condensed in the sub-scanning direction by the fourth cylindrical lens 403, passes through the fourth aperture stop 404, and enters the second deflecting surface 205 of the deflecting unit 10 from below in the sub-scanning direction.

The light flux LD emitted by the fourth light source 401 and entering the second deflecting surface 205 of the deflecting unit 10 is deflected by the deflecting unit 10 and thereafter condensed on the fourth scanned surface 408 by the first and second fθ lenses 406 and 407 and the reflective element 409 (fourth reflective element). The light flux LD deflected by the deflecting unit 10 then scans the fourth scanned surface 408 at a constant speed.

Since the deflecting unit 10 rotates in the A direction in FIG. 3A, the light flux LD deflected for scanning scans the fourth scanned surface 408 in a C direction in FIG. 3A.

In the light scanning apparatus 2 according to this embodiment, the third collimator lens 302, the third cylindrical lens 303, and the third aperture stop 304 form a third incident optical system 90.

In the light scanning apparatus 2 according to this embodiment, the fourth collimator lens 402, the fourth cylindrical lens 403, and the fourth aperture stop 404 form a fourth incident optical system 95.

In the light scanning apparatus 2 according to this embodiment, the first fθ lens 306 and the second fθ lens 307 (third imaging optical element) form the third imaging optical system 300.

In the light scanning apparatus 2 according to this embodiment, the first fθ lens 406 and the second fθ lens 407 (fourth imaging optical element) form the fourth imaging optical system 400.

In the light scanning apparatus 2 according to this embodiment, optical axes of the third and fourth incident optical systems 90 and 95 make an angle of −3.0 degrees with the main scanning section in the sub-scanning section.

In the light scanning apparatus 2 according to this embodiment, imaging optical elements having the greatest refractive power in the sub-scanning section on the same optical path are the second fθ lenses 107, 207, 307, and 407.

In the first imaging optical system 100, the reflective element 109 is provided between the imaging optical element 107 and the deflecting unit 10, the imaging optical element 107 having the greatest refractive power in the sub-scanning section out of the imaging optical elements 106 and 107 included in the first imaging optical system 100 on the optical path.

In the second imaging optical system 200, the reflective element 210 is provided between the imaging optical element 207 and the second scanned surface 208, the imaging optical element 207 having the greatest refractive power in the sub-scanning section out of the imaging optical elements 206 and 207 included in the second imaging optical system 200 on the optical path.

In the third imaging optical system 300, the reflective element 309 is provided between the imaging optical element 307 and the deflecting unit 10, the imaging optical element 307 having the greatest refractive power in the sub-scanning section out of the imaging optical elements 306 and 307 included in the third imaging optical system 300 on the optical path.

In the fourth imaging optical system 400, the reflective element 409 is provided between the imaging optical element 407 and the deflecting unit 10, the imaging optical element 407 having the greatest refractive power in the sub-scanning section out of the imaging optical elements 406 and 407 included in the fourth imaging optical system 400 on the optical path.

In this embodiment, photosensitive drums 308 and 408 are used as the third and fourth scanned surfaces.

Exposure distributions in the sub-scanning direction on the photosensitive drums 308 and 408 are made by rotating the photosensitive drums 308 and 408 in the sub-scanning direction every main scanning exposure.

Arrangement direction E of the photosensitive drums 108, 208, 308, and 408 is not orthogonal to the rotational axis direction (i.e., sub-scanning direction) D of the deflecting unit 10, and makes an angle of −93 degrees with the rotational axis direction in this embodiment.

Next, features of the third and fourth incident optical systems 90 and 95 and the third and fourth imaging optical systems 300 and 400 of the light scanning apparatus 2 according to this embodiment are indicated in the following tables 4 to 6.

TABLE 4

| features of third and fourth light sources 301 and 401 | | |
|---|---|---|
| number of light emitting point | N (piece) | 2 |
| rotation angle | (deg) | 6.54 |
| arrangement | (dimension) | 1 |
| pitch | pitch (mm) | 0.09 |
| wavelength | λ (nm) | 790 |
| incident polarization on first and second deflecting surfaces 105 and 205 of deflecting unit 10 | | p polarization |
| full width at half maximum in main scanning direction | FFPy (deg) | 12.00 |
| full width at half maximum in sub-scanning direction | FFPz (deg) | 30.00 |

| shape of stop | main scanning direction | sub-scanning direction |
|---|---|---|
| third and fourth aperture stops 304 and 404 | 3.050 | 0.782 |

| refractive index | | |
|---|---|---|
| third and fourth collimator lenses 302 and 402 | N1 | 1.762 |
| third and fourth cylindrical lenses 303 and 403 | N2 | 1.524 |

| shape of optical element | | main scanning direction | sub-scanning direction |
|---|---|---|---|
| curvature radius of incident surfaces of third and fourth collimator lenses 302 and 402 | r1a (mm) | ∞ | ∞ |
| curvature radius of exit surfaces of third and fourth collimator lenses 302 and 402 | r1b (mm) | 15.216 | 15.216 |
| curvature radius of incident surfaces of third and fourth cylindrical lenses 303 and 403 | r2a (mm) | ∞ | −41.028 |
| curvature radius of exit surfaces of third and fourth cylindrical lenses 303 and 403 | r2b (mm) | ∞ | ∞ |

| focal length | | main scanning direction | sub-scanning direction |
|---|---|---|---|
| third and fourth collimator lenses 302 and 402 | fcol (mm) | 19.98 | 19.98 |
| third and fourth cylindrical lenses 303 and 403 | fcyl (mm) | ∞ | 78.30 |

| arrangement | | |
|---|---|---|
| third and fourth light sources 301 and 401 to third and fourth collimator lenses 302 and 402 | d0 (mm) | 18.31 |
| incident surfaces of third and fourth collimator lenses 302 and 402 to exit surfaces of third and fourth collimator lenses 302 and 402 | d1 (mm) | 3.25 |
| exit surfaces of third and fourth collimator lenses 302 and 402 to incident surfaces of third and fourth cylindrical lenses 303 and 403 | d2 (mm) | 19.77 |
| incident surfaces of third and fourth cylindrical lenses 303 and 403 to exit surfaces of third and fourth cylindrical lenses 303 and 403 | d3 (mm) | 3.00 |
| exit surfaces of third and fourth cylindrical lenses 303 and 403 to third and fourth aperture stops 304 and 404 | d4 (mm) | 36.71 |
| third and fourth aperture stops 304 and 404 to first and second deflecting surfaces 105 and 205 of deflecting unit 10 | d5 (mm) | 40.33 |

TABLE 4-continued

| | | |
|---|---|---|
| incident angle in main scanning section to first deflecting surface 105 of third incident optical system 90 | A1 (deg) | 90.00 |
| incident angle in main scanning section to second deflecting surface 205 of fourth incident optical system 95 | A2 (deg) | −90.00 |
| incident angle in sub-scanning section to first deflecting surface 105 of third incident optical system 90 | A3 (deg) | −3.00 |
| incident angle in sub-scanning section to second deflecting surface 205 of fourth incident optical system 95 | A4 (deg) | −3.00 |

TABLE 5

| | | |
|---|---|---|
| fθ coefficient, scanning angle, angle of view | | |
| fθ coefficient | k (mm/rad) | 146 |
| scanning width | W (mm) | 230 |
| maximum angle of view | θ (deg) | 22.6 |
| refractive index | | |
| refractive index of first fθ lens 306 | N5 | 1.524 |
| refractive index of second fθ lens 307 | N6 | 1.524 |
| third imaging optical system 300, arrangement | | |
| first deflecting surface 105 of deflecting unit 10 to incident surface of first fθ lens 306 | d12 (mm) | 17.00 |
| incident surface of first fθ lens 306 to exit surface of first fθ lens 306 | d13 (mm) | 6.70 |
| exit surface of first fθ lens 306 to incident surface of second fθ lens 307 | d14 (mm) | 72.30 |
| incident surface of second fθ lens 307 to exit surface of second fθ lens 307 | d15 (mm) | 3.50 |
| exit surface of second fθ lens 307 to third scanned surface 308 | d16 (mm) | 68.50 |
| first deflecting surface 105 of deflecting unit 10 to incident surface of second fθ lens 307 | L1 (mm) | 96.00 |
| first deflecting surface 105 of deflecting unit 10 to third scanned surface 308 | T1 (mm) | 168.00 |
| first fθ lens 306 shape of meridional line | | |
| | incident surface opposite of light source side | exit surface opposite of light source side |
| R | −49.912 | −30.370 |
| ku | 3.517E+00 | −3.284E+00 |
| B4u | 8.144E−06 | −1.046E−05 |
| B6u | 1.731E−08 | 1.703E−08 |
| B8u | −6.571E−11 | −2.092E−11 |
| B10u | 8.472E−14 | −8.007E−15 |
| B12u | 0 | 0 |
| | light source side | light source side |
| kl | 3.517E+00 | −3.284E+00 |
| B4l | 8.144E−06 | −1.050E−05 |
| B6l | 1.731E−08 | 1.749E−08 |
| B8l | −6.571E−11 | −2.257E−11 |
| B10l | 8.472E−14 | −6.096E−15 |
| B12l | 0 | 0 |
| first fθ lens 306 shape of sagittal line | | |
| | incident surface R variation of sagittal line | exit surface R variation of sagittal line |
| r | 13.000 | 22.244 |
| E1 | 0 | −1.642E−04 |

TABLE 5-continued

| | | |
|---|---|---|
| E2 | 0 | −1.204E−03 |
| E3 | 0 | 0 |
| E4 | 0 | 1.538E−06 |
| E5 | 0 | 0 |
| E6 | 0 | −9.773E−10 |
| E7 | 0 | 0 |
| E8 | 0 | 0 |
| E9 | 0 | 0 |
| E10 | 0 | 0 |

| | tilt of sagittal line | tilt of sagittal line |
|---|---|---|
| M0_1 | 0 | −8.101E−02 |
| M1_1 | 0 | 1.262E−06 |
| M2_1 | 0 | 9.130E−05 |
| M3_1 | 0 | 9.910E−08 |
| M4_1 | 0 | −1.107E−08 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |

second fθ lens 307 shape of meridional line

| | incident surface opposite of light source side | exit surface opposite of light source side |
|---|---|---|
| R | −10000 | 279.878 |
| ku | 0 | −5.367E+01 |
| B4u | 0 | −3.311E−07 |
| B6u | 0 | 4.279E−11 |
| B8u | 0 | −4.922E−15 |
| B10u | 0 | 3.461E−19 |
| B12u | 0 | −1.034E−23 |

| | light source side | light source side |
|---|---|---|
| kl | 0 | −5.367E+01 |
| B4l | 0 | −3.335E−07 |
| B6l | 0 | 4.318E−11 |
| B8l | 0 | −4.880E−15 |
| B10l | 0 | 3.327E−19 |
| B12l | 0 | −9.723E−24 |

second fθ lens 307 shape of sagittal line

| | incident surface R variation of sagittal line | exit surface R variation of sagittal line |
|---|---|---|
| r | 22.604 | −1000 |
| E1 | 9.474E−05 | 0 |
| E2 | 8.693E−05 | 0 |
| E3 | 0 | 0 |
| E4 | −4.848E−09 | 0 |
| E5 | 0 | 0 |
| E6 | 1.645E−13 | 0 |
| E7 | 0 | 0 |
| E8 | −2.038E−17 | 0 |
| E9 | 0 | 0 |
| E10 | 0 | 0 |

| | tilt of sagittal line | tilt of sagittal line |
|---|---|---|
| M0_1 | −1.683E−01 | 2.737E−02 |
| M1_1 | −2.480E−04 | −2.605E−04 |
| M2_1 | 6.372E−06 | −1.325E−05 |
| M3_1 | 4.718E−08 | 4.429E−08 |
| M4_1 | −2.700E−09 | 5.426E−10 |
| M5_1 | −5.354E−28 | 2.061E−28 |
| M6_1 | 3.256E−14 | −3.757E−13 |
| M7_1 | 8.193E−16 | 3.438E−16 |
| M8_1 | 1.575E−16 | 1.071E−16 |

TABLE 5-continued

| | | |
|---|---|---|
| M9_1 | −2.174E−20 | 6.387E−20 |
| M10_1 | −3.849E−21 | 6.178E−21 |
| M11_1 | 0 | 0 |
| M12_1 | 0 | 0 |

TABLE 6

| fθ coefficient, scanning angle, angle of view | | |
|---|---|---|
| fθ coefficient | k (mm/rad) | 146 |
| scanning width | W (mm) | 230 |
| maximum angle of view | θ (deg) | 22.6 |
| refractive index | | |
| refractive index of first fθ lens 406 | N5 | 1.524 |
| refractive index of second fθ lens 407 | N6 | 1.524 |
| fourth imaging optical system 400, arrangement | | |
| second deflecting surface 205 of deflecting unit 10 to incident surface of first fθ lens 406 | d12 (mm) | 17.00 |
| incident surface of first fθ lens 406 to exit surface of first fθ lens 406 | d13 (mm) | 6.70 |
| exit surface of first fθ lens 406 to incident surface of second fθ lens 407 | d14 (mm) | 56.30 |
| incident surface of second fθ lens 407 to exit surface of second fθ lens 407 | d15 (mm) | 3.50 |
| exit surface of second fθ lens 407 to fourth scanned surface 408 | d16 (mm) | 84.50 |
| second deflecting surface 205 of deflecting unit 10 to incident surface of second fθ lens 407 | L2 (mm) | 80.00 |
| second deflecting surface 205 of deflecting unit 10 to fourth scanned surface 408 | T2 (mm) | 168.00 |

| first fθ lens 406 shape of meridional line | | |
|---|---|---|
| | incident surface opposite of light source side | exit surface opposite of light source side |
| R | −39.866 | −26.253 |
| ku | 2.065E+00 | −2.866E+00 |
| B4u | 9.292E−06 | −1.398E−05 |
| B6u | 3.110E−08 | 2.362E−08 |
| B8u | −1.025E−10 | −2.189E−11 |
| B10u | 1.310E−13 | −2.171E−14 |
| B12u | 0 | 0 |
| | light source side | light source side |
| kl | 2.065E+00 | −2.866E+00 |
| B4l | 9.292E−06 | −1.412E−05 |
| B6l | 3.110E−08 | 2.454E−08 |
| B8l | −1.025E−10 | −2.394E−11 |
| B10l | 1.310E−13 | −1.979E−14 |
| B12l | 0 | 0 |

| first fθ lens 406 shape of sagittal line | | |
|---|---|---|
| | incident surface R variation of sagittal line | exit surface R variation of sagittal line |
| r | 13.000 | 11.268 |
| E1 | 0 | 1.455E−04 |
| E2 | 0 | −1.686E−04 |
| E3 | 0 | 0 |
| E4 | 0 | −4.846E−07 |
| E5 | 0 | 0 |
| E6 | 0 | 1.156E−09 |
| E7 | 0 | 0 |
| E8 | 0 | 0 |
| E9 | 0 | 0 |
| E10 | 0 | 0 |

TABLE 6-continued

| | tilt of sagittal line | tilt of sagittal line |
|---|---|---|
| M0_1 | 0 | −3.845E−02 |
| M1_1 | 0 | 9.266E−06 |
| M2_1 | 0 | 8.686E−05 |
| M3_1 | 0 | 0 |
| M4_1 | 0 | 0 |
| M5_1 | 0 | 0 |
| M6_1 | 0 | 0 |
| M7_1 | 0 | 0 |
| M8_1 | 0 | 0 |
| M9_1 | 0 | 0 |
| M10_1 | 0 | 0 |
| M11_1 | 0 | 0 |
| M12_1 | 0 | 0 |
| second fθ lens 407 shape of meridional line | | |
| | incident surface opposite of light source side | exit surface opposite of light source side |
| R | −10000 | 228.410 |
| ku | 0 | −5.462E+01 |
| B4u | 0 | −5.399E−07 |
| B6u | 0 | 1.054E−10 |
| B8u | 0 | −1.701E−14 |
| B10u | 0 | 1.722E−18 |
| B12u | 0 | −7.826E−23 |
| | light source side | light source side |
| kl | 0 | −5.462E+01 |
| B4l | 0 | −5.411E−07 |
| B6l | 0 | 1.067E−10 |
| B8l | 0 | −1.777E−14 |
| B10l | 0 | 1.890E−18 |
| B12l | 0 | −9.085E−23 |
| second fθ lens 407 shape of sagittal line | | |
| | incident surface R variation of sagittal line | exit surface R variation of sagittal line |
| r | 60.676 | −31.725 |
| E1 | 0 | 2.169E−04 |
| E2 | 4.470E−04 | 3.483E−05 |
| E3 | 0 | 0 |
| E4 | −4.827E−08 | 5.550E−09 |
| E5 | 0 | 0 |
| E6 | −2.372E−12 | −3.405E−12 |
| E7 | 0 | 0 |
| E8 | 2.304E−15 | 2.138E−16 |
| E9 | 0 | 0 |
| E10 | 0 | 0 |
| | tilt of sagittal line | tilt of sagittal line |
| M0_1 | 9.462E−02 | −8.550E−02 |
| M1_1 | 3.547E−04 | 3.581E−04 |
| M2_1 | 2.849E−06 | 3.393E−05 |
| M3_1 | −5.463E−08 | −7.297E−08 |
| M4_1 | 1.278E−09 | −9.985E−09 |
| M5_1 | 2.873E−12 | 1.851E−11 |
| M6_1 | −1.077E−12 | 2.695E−12 |
| M7_1 | 2.305E−15 | −1.912E−15 |
| M8_1 | −2.333E−16 | −7.635E−16 |
| M9_1 | −1.496E−19 | 2.569E−19 |
| M10_1 | 2.586E−20 | 4.568E−20 |
| M11_1 | 0 | 0 |
| M12_1 | 0 | 0 |

In the tables 4 to 6, assuming that an intersection of each lens surface and the optical axis of each lens is the origin, the direction of the optical axis is the X axis, the direction orthogonal to the optical axis in the main scanning section is the Y axis, and the direction orthogonal to the optical axis in the sub-scanning section is the Z axis. In tables 5 and 6, "E−x" means "$\times 10^{-x}$."

An aspherical shape (shape of meridional line) in the main scanning section of each lens surface of the first and second fθ lenses 306, 307, 406, and 407 of the light scanning apparatus 2 according to this embodiment is expressed by the abovementioned expression (1).

An aspherical shape (shape of sagittal line) in the sub-scanning section of each lens surface of the first and second fθ lenses 306, 307, 406, and 407 is expressed by the abovementioned expression (2).

A curvature radius r' in the sub-scanning section of each lens surface of the first and second fθ lenses 306, 307, 406, and 407 is sequentially varied according to the y coordinate of the lens surface as being expressed by the abovementioned expression (3).

Next, an effect in the light scanning apparatus 2 according to this embodiment is described.

In the light scanning apparatus 2 according to this embodiment, it is possible to reduce intervals between the first to fourth scanned surfaces 108 to 408. Specifically, each interval between the first to fourth scanned surfaces 108 to 408 is 52 mm.

In the light scanning apparatus 2 according to this embodiment, as illustrated in FIG. 3B, a distance on the optical axis of the third imaging optical system 300 between an axial deflecting point 305*c* (third axial deflecting point) on the first deflecting surface 105 in the main scanning section and the second fθ lens 307 is represented by L3, and a distance on the optical axis of the third imaging optical system 300 between the axial deflecting point 305*c* in the main scanning section and the third scanned surface 308 is represented by T3.

A distance on the optical axis of the fourth imaging optical system 400 between an axial deflecting point 405*c* (fourth axial deflecting point) on the second deflecting surface 205 in the main scanning section and the second fθ lens 407 is represented by L4, and a distance on the optical axis of the fourth imaging optical system 400 between the axial deflecting point 405*c* in the main scanning section and the fourth scanned surface 408 is represented by T4.

In the light scanning apparatus 2 according to this embodiment, L3=96 mm, T3=168 mm, L4=80 mm, and T4=168 mm.

L3/T3=0.571 and L4/T4=0.476 are thus obtained, and L3/T3>L4/T4 is accordingly satisfied. When this conditional expression is satisfied, it is possible to achieve downsizing of the light scanning apparatus while suppressing increase of the magnification of the imaging optical system and increase of the size of the image forming apparatus in which the light scanning apparatus is mounted.

It is desirable that the light scanning apparatus 2 according to this embodiment satisfy T3=T4. When this expression is satisfied, it is possible to further suppress increase of the size of the image forming apparatus due to wide intervals between photosensitive bodies.

If the third and fourth imaging optical systems 300 and 400 are arranged so as to satisfy L3/T3<L4/T4 in the light scanning apparatus 2 according to this embodiment, the second fθ lens 307 has to be moved to be close to the first deflecting surface 105 of the deflecting unit 10 in the third imaging optical system 300. This causes the second fθ lens 307 to interfere with the reflective element 310 and also the optical path of the first imaging optical system 100.

In the light scanning apparatus 2 according to this embodiment, likewise the light scanning apparatus 1 according to the first embodiment, the first and second imaging optical systems 100 and 200 are arranged so as to satisfy L1/T1>L2/T2 in order to achieve downsizing of the light scanning apparatus 2 and to secure the space between the light scanning apparatus 2 and the photosensitive drum 208.

In the light scanning apparatus 2 according to this embodiment, as illustrated in FIG. 3C, a distance between the origin of an exit surface of the second fθ lens 107 and the first scanned surface 108 in the sub-scanning section is represented by H1, and a distance between the origin of an exit surface of the second fθ lens 407 and the fourth scanned surface 408 in the sub-scanning section is represented by H4.

In the light scanning apparatus 2 according to this embodiment, as illustrated in FIG. 3C, in the fourth imaging optical system 400, the reflective element 409 is arranged between the second deflecting surface 205 of the deflecting unit 10 and the second fθ lens 407. This makes it possible to satisfy H4>H1 and secure a space between the light scanning apparatus 2 and the photosensitive drum 408.

In the light scanning apparatus 2 according to this embodiment, as illustrated in FIG. 3C, an arrangement direction E of the photosensitive drums 108, 208, 308, and 408 is inclined at −93 degrees with respect to the rotational axis direction D of the deflecting unit 10 in a direction in which the space of the second imaging optical system 200 is increased. In other words, a straight line J is not perpendicular to the sub-scanning direction D, the straight line J passing through the first light-condensing position, the second light-condensing position G, a third light-condensing position H, and a fourth light-condensing position I of the first to fourth light fluxes LA, LB, LC, and LD deflected by the first and second deflecting surfaces 105 and 205 on the respective optical axes of the first to fourth imaging optical systems 100, 200, 300, and 400. Thus, the interference between the optical elements arranged in the second imaging optical system 200 is avoided.

Since the second fθ lenses 107 and 307 in the light scanning apparatus 2 according to this embodiment have the same lens shape, the cost-reduction is achieved. However, the second fθ lenses 107 and 307 may not have the same lens shape.

On the other hand, at least either pair of the incident surfaces and the exit surfaces of the second fθ lenses 107 and 207 have different shapes from each other.

It is desirable that at least one of the incident surface and the exit surface of at least either the second fθ lens 207 or 407 be a mirror symmetric shape with respect to the main scanning section including the optical axis.

In the light scanning apparatus 2 according to this embodiment, likewise the light scanning apparatus 1 according to the first embodiment, L1=96 mm, T1=168 mm, L2=80 mm, and T2=168 mm.

Thus, T1=T2=T3=T4, L1=L3, and L2=L4 are also satisfied.

As described above, in the light scanning apparatus 2 according to this embodiment, the optical elements are arranged so as to satisfy the abovementioned relationship. This makes it possible to achieve downsizing of the light scanning apparatus 2 while avoiding the interference between the optical elements and secure the space between the light scanning apparatus 2 and the photosensitive drums 108 to 408.

Although the preferable embodiments of the present invention are described, the present invention is not limited to these embodiments, and various modifications and changes may be made without departing from the gist of the invention.

[Image Forming Apparatus]

Figure 4:
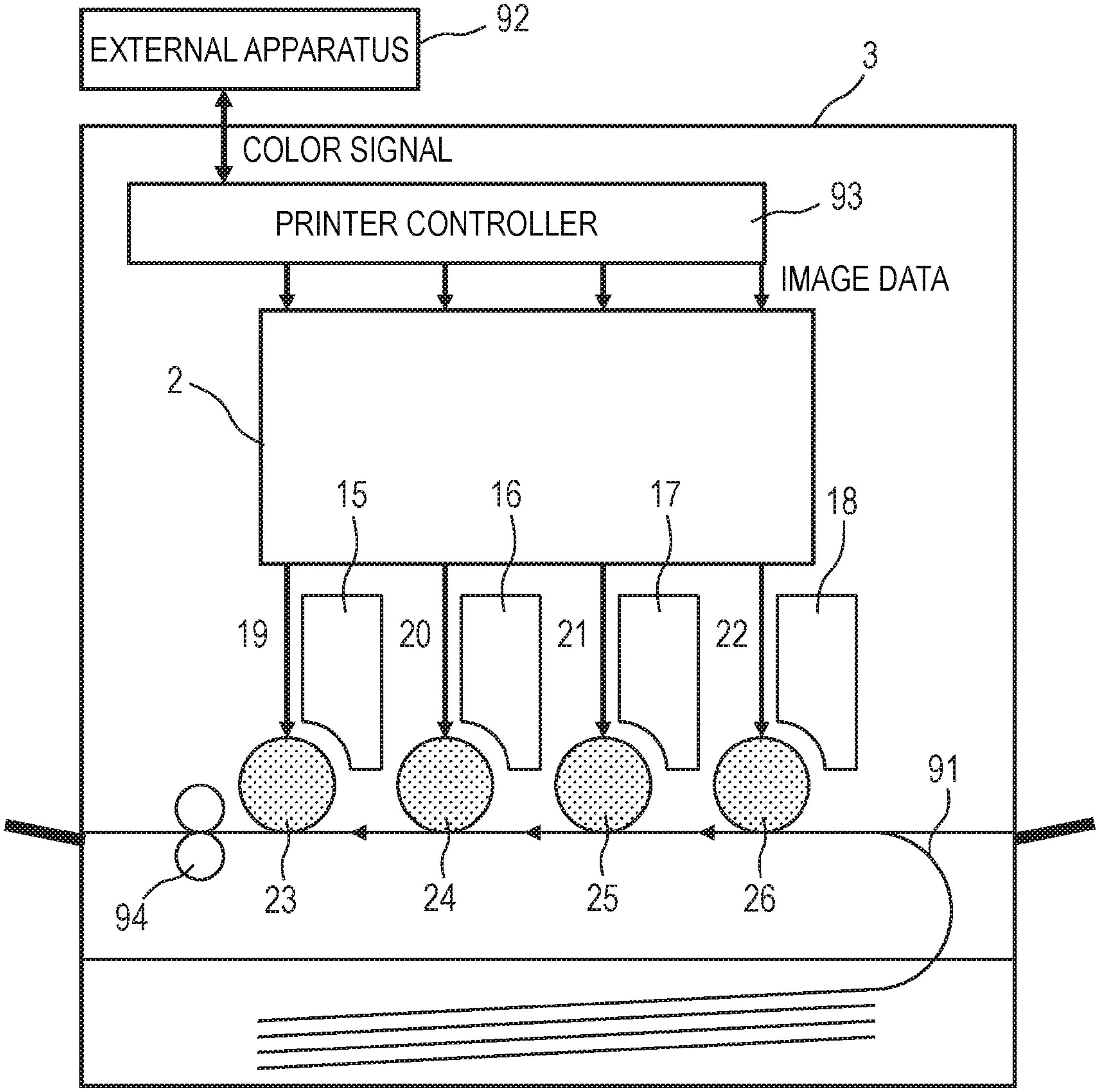
FIG. 4 is a view in a sub-scanning section of a main part of a color image forming apparatus according to an embodiment.

FIG. 4 is a view in a sub-scanning section of a main part of a color image forming apparatus 3 in which the light scanning apparatus 2 according to the second embodiment is mounted.

The image forming apparatus 3 is a tandem-type color image forming apparatus for recording image information on photosensitive drums as image carriers by using the light scanning apparatus.

The image forming apparatus 3 includes the light scanning apparatus 2 according to the second embodiment, the photosensitive drums as image carriers (photosensitive bodies) 23, 24, 25, and 26, and developing units 15, 16, 17, and 18. The image forming apparatus 3 further includes a conveying belt 91, a printer controller 93, and a fixing unit 94.

Color signals (code data) of R (red), G (green), and B (blue) outputted by an external apparatus 92, such as a personal computer, are inputted to the image forming apparatus 3. The inputted color signals are converted into image data (dot data) of C (cyan), M (magenta), Y (yellow), and K (black) by the printer controller 93 in the image forming apparatus 3. The converted image data is inputted to the light scanning apparatus 2. The light scanning apparatus 2 emits light beams 19, 20, 21, and 22 respectively modulated based on the corresponding image data, and photosensitive surfaces of the photosensitive drums 23, 24, 25, and 26 are exposed to these light beams.

Charging rollers (unillustrated) for uniformly charge the surfaces of the photosensitive drums 23, 24, 25, and 26 are provided so as to be come into contact with the surfaces. The surfaces of the photosensitive drums 23, 24, 25, and 26 charged by the charging rollers are irradiated with the light beams 19, 20, 21, and 22 by the light scanning apparatus 2.

As described above, the light beams 19, 20, 21, and 22 are modulated based on the respective color image data; thus, electrostatic latent images are formed on the surfaces of the photosensitive drums 23, 24, 25, and 26 by the irradiation with the light beams 19, 20, 21, and 22. The formed electrostatic latent images are developed as toner images by the developing units 15, 16, 17, and 18 arranged so as to be come into contact with the photosensitive drums 23, 24, 25, and 26.

The toner images developed by the developing units 15 to 18 are multiple-transferred to an unillustrated sheet (transferred material) conveyed on the conveying belt 91 by unillustrated transferring rollers (transferring units) arranged so as to face the photosensitive drums 23 to 26, and thus a sheet of full-color image is formed.

As described above, the sheet on which the unfixed toner image is transferred is further conveyed to the fixing unit 94 behind (on left side in FIG. 4) the photosensitive drums 23 to 26. The fixing unit 94 includes a fixing roller having a fixing heater (unillustrated) therein, and a pressuring roller arranged so as to be pressingly come into contact with the fixing roller. The sheet conveyed from the transferring unit is pressurized and heated by the fixing roller and a pressingly applied portion of the pressuring roller, and the unfixed toner image on the sheet is fixed. An unillustrated discharging roller is arranged behind the fixing roller, and the discharging roller discharges the fixed sheet to outside the image forming apparatus 3.

The color image forming apparatus 3 allows the light scanning apparatus 2 to record the image signals (image information) on the photosensitive surfaces of the photosensitive drums 23, 24, 25, and 26 corresponding to the colors C, M, Y, and K concurrently and to make fast printing of a color image.

A color image reading apparatus provided with a CCD sensor may be used as the external apparatus 92, for example. In this case, this color image reading apparatus and the color image forming apparatus 3 form a color digital copier.

Two of the light scanning apparatus 1 according to the first embodiment may be arranged next to each other instead of using the light scanning apparatus 2.

According to the present invention, it is possible to provide a downsized light scanning apparatus, which avoids increase of the magnification of an imaging optical system and increase of the size of an image forming apparatus in which the imaging optical system is mounted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-048942, filed Mar. 16, 2018, which is hereby incorporated by reference herein in its entirety.

What is claimed is:

1. A light scanning apparatus, comprising:

a deflecting unit including first and second deflecting surfaces configured to deflect first and second light fluxes to scan first and second scanned surfaces in a main scanning direction; and first and second imaging optical systems configured to condense the first and second light fluxes deflected by the deflecting unit on the first and second scanned surfaces, wherein the first imaging optical system includes one or more imaging optical elements and a first reflective element arranged on an optical path between a first imaging optical element and the deflecting unit, the first imaging optical element having the greatest refractive power in a sub-scanning section out of the one or more imaging optical elements, the second imaging optical system includes one or more imaging optical elements and a second reflective element arranged on an optical path between a second imaging optical element and the second scanned surface, the second imaging optical element having the greatest refractive power in the sub-scanning section out of the one or more imaging optical elements, a straight line, which passes through first and second light-condensing positions of the first and second light fluxes deflected by the deflecting unit on first and second optical axes of the first and second imaging optical systems, is not perpendicular to a sub-scanning direction, and the following conditional expression is satisfied:

$$L1/T1>L2/T2,$$

where L1 represents a distance on the first optical axis between a first axial deflecting point on the first deflecting surface and the first imaging optical element, T1 represents a distance on the first optical axis between the first axial deflecting point and the first scanned surface, L2 represents a distance on the second optical axis between a second axial deflecting point on the second deflecting surface and the second imaging optical element, and T2 represents a distance on the second optical axis between the second axial deflecting point and the second scanned surface.

2. The light scanning apparatus according to claim 1, wherein the second reflective element is arranged at a side of the second scanned surface with respect to a main scanning section passing through the deflecting unit.

3. The light scanning apparatus according to claim 1, wherein an expression of T1=T2 is satisfied.

4. The light scanning apparatus according to claim 1, wherein shapes of incident surfaces of the first and second imaging optical elements are different from each other.

5. The light scanning apparatus according to claim 1, wherein shapes of exit surfaces of the first and second imaging optical elements are different from each other.

6. The light scanning apparatus according to claim 1, wherein the deflecting unit deflects third and fourth light fluxes by the first and second deflecting surfaces to scan third and fourth scanned surfaces in the main scanning direction.

7. The light scanning apparatus according to claim 6 further comprises third and fourth imaging optical systems configured to condense the third and fourth light fluxes deflected by the deflecting unit on the third and fourth scanned surfaces.

8. The light scanning apparatus according to claim 7, wherein the third imaging optical system includes one or more imaging optical elements and a third reflective element arranged on an optical path between a third imaging optical element and the deflecting unit, the third imaging optical element having the greatest refractive power in the sub-scanning section out of the one or more imaging optical elements.

9. The light scanning apparatus according to claim 7, wherein the fourth imaging optical system includes one or more imaging optical elements and a fourth reflective element arranged on an optical path between a fourth imaging optical element and the deflecting unit, the fourth imaging optical element having the greatest refractive power in the sub-scanning section out of the one or more imaging optical elements.

10. The light scanning apparatus according to claim 7, wherein a straight line, which passes through third and fourth light-condensing positions of the third and fourth light fluxes deflected by the deflecting unit on third and fourth optical axes of the third and fourth imaging optical systems, is not perpendicular to the sub-scanning direction.

11. The light scanning apparatus according to claim 7, wherein each of the third and fourth imaging optical systems include one or more imaging optical elements, and the following conditional expression is satisfied:

$$L3/T3>L4/T4,$$

where L3 represents a distance on a third optical axis of the third imaging optical system between a third axial deflecting point on the first deflecting surface and a third imaging optical element having the greatest refractive power in the sub-scanning section out of one or more imaging optical elements, T3 represents a distance on the third optical axis between the third axial deflecting point and the third scanned surface, L4 represents a distance on a fourth optical axis of the fourth imaging optical system between a fourth axial deflecting point on the second deflecting surface and a fourth imaging optical element having the greatest refractive power in the sub-scanning section out of one or more imaging optical elements, and T4 represents a distance on the fourth optical axis between the fourth axial deflecting point and the fourth scanned surface.

12. The light scanning apparatus according to claim 11, wherein an expression of T3=T4 is satisfied.

13. The light scanning apparatus according to claim 11, wherein an expression of T1=T2=T3=T4 is satisfied.

14. The light scanning apparatus according to claim 11, wherein an expression of L1=L3 is satisfied.

15. The light scanning apparatus according to claim 11, wherein an expression of L2=L4 is satisfied.

16. The light scanning apparatus according to claim 9, wherein a distance in the sub-scanning section between the first imaging optical element and the first light-condensing position is different from a distance in the sub-scanning section between the fourth imaging optical element and a fourth light-condensing position of the fourth light flux deflected by the deflecting unit on a fourth optical axis of the fourth imaging optical system.

17. The light scanning apparatus according to claim 8, wherein shapes of the first and third imaging optical elements are the same.

18. The light scanning apparatus according to claim 9, wherein shapes of incident surfaces of the second and fourth imaging optical elements are mirror symmetric with respect to the main scanning section.

19. The light scanning apparatus according to claim 1, further comprising:

a third imaging optical system, wherein the deflecting unit deflects a third light flux by the first deflecting surface to scan a third scanned surface in the main scanning direction, the third imaging optical system condenses the third light flux deflected by the deflecting unit on the third scanned surface, and the third imaging optical system includes one or more imaging optical elements and a third reflective element arranged on an optical path between a third imaging optical element and the deflecting unit, the third imaging optical element having the greatest refractive power in the sub-scanning section out of the one or more imaging optical elements.

20. An image forming apparatus, comprising:

the light scanning apparatus according to claim 1;

a developing unit which develops an electrostatic latent image formed on a scanned surface by the light scanning apparatus as a toner image;

a transferring unit which transfers the developed toner image on a transferred material; and a fixing unit which fixes the transferred toner image on the transferred material.

* * * * *